(12) United States Patent
Phillips et al.

(10) Patent No.: US 11,376,730 B2
(45) Date of Patent: Jul. 5, 2022

(54) MODULAR ROBOTIC SYSTEM

(71) Applicant: BLUEPRINT LAB PTY LTD, Marrickville (AU)

(72) Inventors: Paul Michael Phillips, Marrickville (AU); Mark Creighton Sproule, Marrickville (AU)

(73) Assignee: BLUEPRINT LAB PTY LTD, Marrickville (AU)

( * ) Notice: Subject to any disclaimer, the term of this patent is extended or adjusted under 35 U.S.C. 154(b) by 366 days.

(21) Appl. No.: 16/454,232

(22) Filed: Jun. 27, 2019

(65) Prior Publication Data

US 2020/0061809 A1   Feb. 27, 2020

(30) Foreign Application Priority Data

Aug. 21, 2018   (AU) ................................ 2018220014

(51) Int. Cl.
*B25J 9/08* (2006.01)
*B25J 9/12* (2006.01)
*B25J 19/00* (2006.01)

(52) U.S. Cl.
CPC ................ *B25J 9/08* (2013.01); *B25J 9/126* (2013.01); *B25J 19/0041* (2013.01)

(58) Field of Classification Search
CPC ..... B25J 18/00; B25J 18/04; B25J 9/08; B25J 9/126
See application file for complete search history.

(56) References Cited

U.S. PATENT DOCUMENTS

2017/0021507 A1* 1/2017 Jackson ............... B25J 17/0275

* cited by examiner

*Primary Examiner* — Randell J Krug
(74) *Attorney, Agent, or Firm* — Browdy and Neimarrk, PLLC

(57) ABSTRACT

Disclosed is an actuator mechanism for a modular robotic system. The actuator mechanism includes a motor, a carrier configured to be secured to the motor, and an actuating member operable by the motor to cause the actuating member to move relative to the carrier. The motor has a drive shaft which defines an output axis, and a body extending away from the shaft, the body defining a maximum width dimension orthogonal to the output axis. The carrier defines a longitudinal axis parallel to the output axis. The output axis is arranged, by the carrier, to be offset from the longitudinal axis by at least half of the maximum width dimension. Also disclosed is a module for a modular robotic system, and a modular robotic system.

19 Claims, 11 Drawing Sheets

MODULAR ROBOTIC SYSTEM

TECHNICAL FIELD

The present disclosure relates generally to modular robotic systems and, in particular, relates to modular robotic arms typically employed as an accessory for a remotely operated vehicle.

BACKGROUND

Robotic systems are widely used to automate manipulation of objects. Such systems are generally employed to enhance efficiency of manipulation processes and/or safety of users. For example, robotic arms are employed in the automotive industry to automate vehicle part handling, assembling, welding and painting operations to achieve both of these objectives.

Some robotic systems are configured to enable object manipulation in hostile or remote environments, for example, to perform maintenance of sub-sea structures. Such systems are typically configured as robotic arms and secured to an unmanned vehicle which is remotely operable by a user. Operating the arm allows objects to be remotely manipulated. Known remotely operable robotic manipulators are typically large, complex assemblies which are expensive to purchase and maintain. Also, due to their size, these systems are often unable to access space-restricted locations.

Any discussion of documents, acts, materials, devices, articles or the like which has been included in the present specification is not to be taken as an admission that any or all of these matters were common general knowledge in the field relevant to the present disclosure as it existed before the priority date of each of the appended claims.

SUMMARY

According to some disclosed embodiments, there is provided an actuator mechanism for a modular robotic system. The actuator mechanism comprises: a motor having a drive shaft, the shaft defining an output axis, and a body extending away from the shaft, the body defining a maximum width dimension orthogonal to the output axis; a carrier configured to be secured to the motor, the carrier defining a longitudinal axis parallel to the output axis; and an actuating member operatively connected to the shaft such that operation of the motor causes the actuating member to move relative to the carrier. The output axis is arranged offset from the longitudinal axis by at least half of the maximum width dimension.

The output axis is arranged relative to the longitudinal axis by the motor being secured to the carrier. The carrier may define a receiving formation shaped to at least partially receive the motor, and the receiving formation define the longitudinal axis. The receiving formation may be at least partially tubular, typically being cylindrical, to define the longitudinal axis. The receiving formation may be further shaped to at least partially receive a further like motor arranged in an opposed orientation to the motor.

Operation of the motor may cause the actuating member to one of move along the longitudinal axis, rotate about the longitudinal axis, and rotate about an actuator axis arranged transverse to the longitudinal axis.

The actuation mechanism may also include a gearing mechanism arranged between the shaft and the actuating member, the gearing mechanism configured to transmit drive to the actuating member.

According to other disclosed embodiments, a module for a modular robotic system is provided, the module including at least one of the actuator mechanisms described above and a sleeve sealingly engaged with the, or each, carrier, to define a sealed volume, the sleeve defining a further longitudinal axis arranged coaxially to the longitudinal axis of the, or each, carrier.

The module may include an end cap and the sleeve is sealingly engaged with the end cap such that the end cap, the sleeve and the carrier define the sealed volume.

The module may include a pair of the actuator mechanisms and the the sleeve is sealingly engaged with both carriers such that the sleeve and the carriers define the sealed volume. In this embodiment, the motors may be arranged adjacent to each other and in an opposed orientation.

Each of the sleeve and the, or each carrier may define a complementary bayonet fitting configured to engage the sleeve and the, or each, carrier. One of the sleeve and the, or each, carrier may define a male connector, and the other may define a female connector. The male connector may have a flange defining a free end and a plurality of mating surfaces facing away from the free end, and the female connector may define an aperture defining an open end and dimensioned to at least partially receive the flange, and further defines a plurality of complementary mating surfaces facing away from the open end, whereby arranging the mating surfaces of the male connector against the mating surfaces of the female connector frictionally engages the sleeve and the carrier.

The module may also include a compression member arranged about the male connector such that the compression member is compressed between the sleeve and the associated carrier when the sleeve frictionally engages the carrier.

Each mating surface may be defined by a radially extending protrusion, and each protrusion extending from the male connector is shaped to at least partially receive one of the protrusions extending from the female connector.

According to another aspect of the disclosure, there is provided a modular robotic system comprising at least two of the modules described above. The at least two modules are releasably connected to and sealingly engaged with each other, and at least one of the actuators is arranged such that operation of the at least one actuator moves one of the modules relative to another of the modules.

One of the modules may define a male connector and another of the modules may define a female connector configured to at least partially receive and engage with the male connector, wherein one of the male connector and the female connector has a locking nut threadedly engaged with the associated connector and operable to urge the male connector and the female connector into engagement.

Each of the male connector and the female connector may define a complementary bayonet fitting configured to engage the associated modules. The male connector may have a flange defining a free end and a plurality of mating surfaces facing away from the free end, and the female connector may define an aperture defining an open end and dimensioned to at least partially receive the flange, and further defines a plurality of complementary mating surfaces facing away from the open end, whereby arranging the mating surfaces of the male connector against the mating surfaces of the female connector frictionally engages the associated modules.

Each mating surface may be defined by a radially extending protrusion, and wherein each protrusion extending from the male connector is shaped to at least partially receive one of the protrusions extending from the female connector.

Each of the male connector and the female connector may include an electrical connector. Frictionally engaging the male connector and the female connector may connect the electrical connectors such that, in use, at least one of power and data is communicated between the engaged modules. Alternatively, one of the electrical connectors includes a threaded shaft, and the other electrical connector includes a threaded nut and, in use, the nut threadedly engages the shaft to engage the electrical connectors so that at least one of power and data is communicated between the engaged modules.

According to another aspect of the disclosure, there is provided a module for a modular robotic system. The module includes: an at least partially elongate housing defining a sealed volume, the housing defining a longitudinal axis; at least one motor; and an actuating member associated with the at least one motor; the, or each, motor having a drive shaft, the shaft defining an output axis, and a body extending away from the shaft, the body defining a maximum width dimension orthogonal to the output axis, the actuating member operatively connected to the associated shaft such that operation of the associated motor causes the actuating member to move relative to the housing, wherein the, or each, output axis is arranged offset from the longitudinal axis by at least half of the maximum width dimension.

The module may include a pair of the motors associated with a respective pair of the actuating members, and the motors be arranged in an opposed orientation.

According to a further aspect of the disclosure, there is provided at least two modules releasably connected to and sealingly engaged with each other. Each module defines a sealed volume. At least one of the modules includes a motor operatively connected to an actuator, the actuator being connected to another of the modules, and wherein operation of the motor causes the actuator to move the connected module.

One of the modules may defines a male connector and another of the modules may define a female connector configured to at least partially receive and engage with the male connector, and one of the male connector and the female connector has a locking nut threadedly engaged with the associated connector and operable to urge the male connector and female connector into engagement.

Each of the male connector and the female connector may define a complementary bayonet fitting configured to engage the associated modules. The male connector may have a flange defining a free end and a plurality of mating surfaces facing away from the free end, and the female connector may define an aperture defining an open end and dimensioned to at least partially receive the flange, and further defines a plurality of complementary mating surfaces facing away from the open end, whereby arranging the mating surfaces of the male connector against the mating surfaces of the female connector frictionally engages the associated modules.

Each mating surface may be defined by a radially extending protrusion, and wherein each protrusion extending from the male connector is shaped to at least partially receive one of the protrusions extending from the female connector.

Each of the male connector and the female connector may include an electrical connector. Frictionally engaging the male connector and the female connector may connect the electrical connectors such that, in use, at least one of power and data is communicated between the engaged modules. Alternatively, one of the electrical connectors includes a threaded shaft, and the other electrical connector includes a threaded nut and, in use, the nut threadedly engages the shaft to engage the electrical connectors so that at least one of power and data is communicated between the engaged modules.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments will now be described by way of example only with reference to the accompany drawings in which.

DESCRIPTION OF EMBODIMENTS

Figure 3:
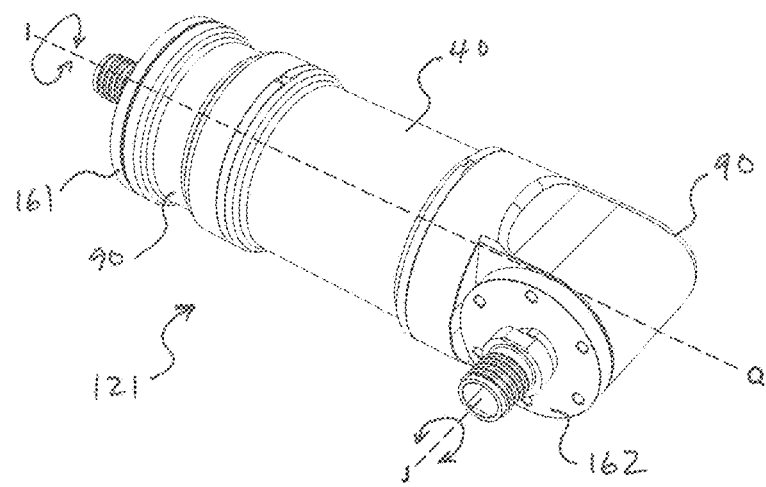
FIGS. 3 to 5 are perspective views of three modules for constructing the systems shown in FIGS. 1 and 2.
Figure 4:
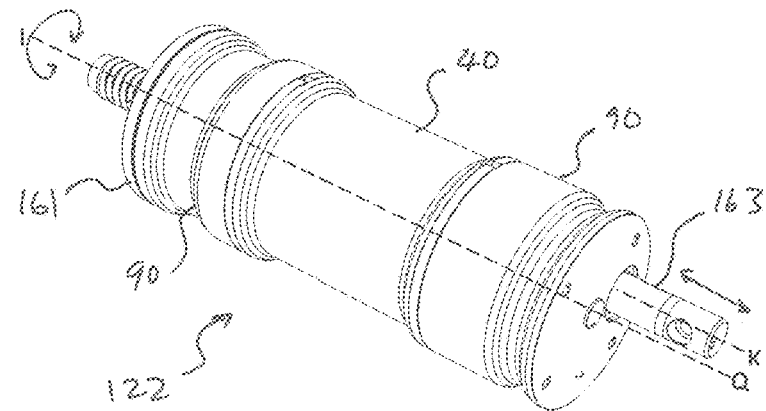
Figure 5:
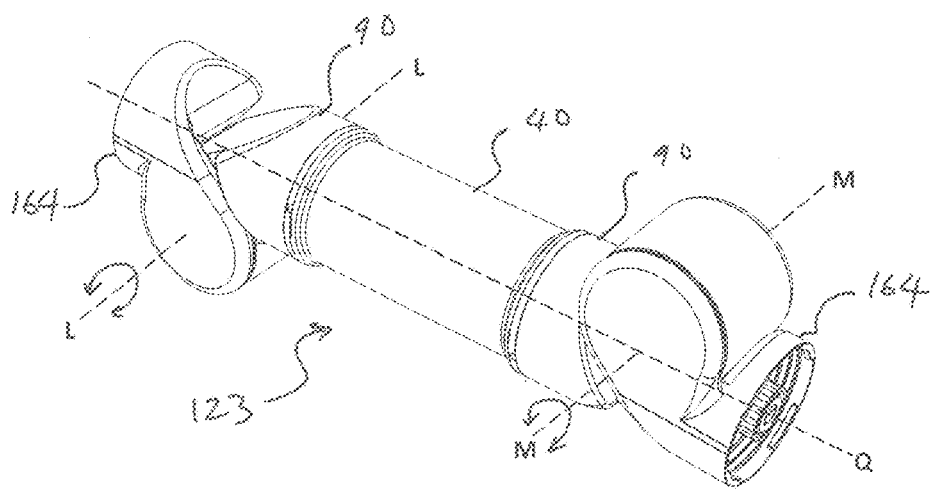

In the drawings, reference numeral 10 generally designates a modular robotic system 10 which includes at least two modules 12 releasably connected to, and sealingly engaged with, each other. Each module 12 defines a sealed volume. At least one of the modules 12 includes a motor 14 (FIGS. 11 to 16) operatively connected to an actuator 16 (FIGS. 3 to 5). The actuator 16 is secured to another of the modules 12 so that operation of the motor 14 causes the actuator 16 to move the connected module 12.

Figure 1:
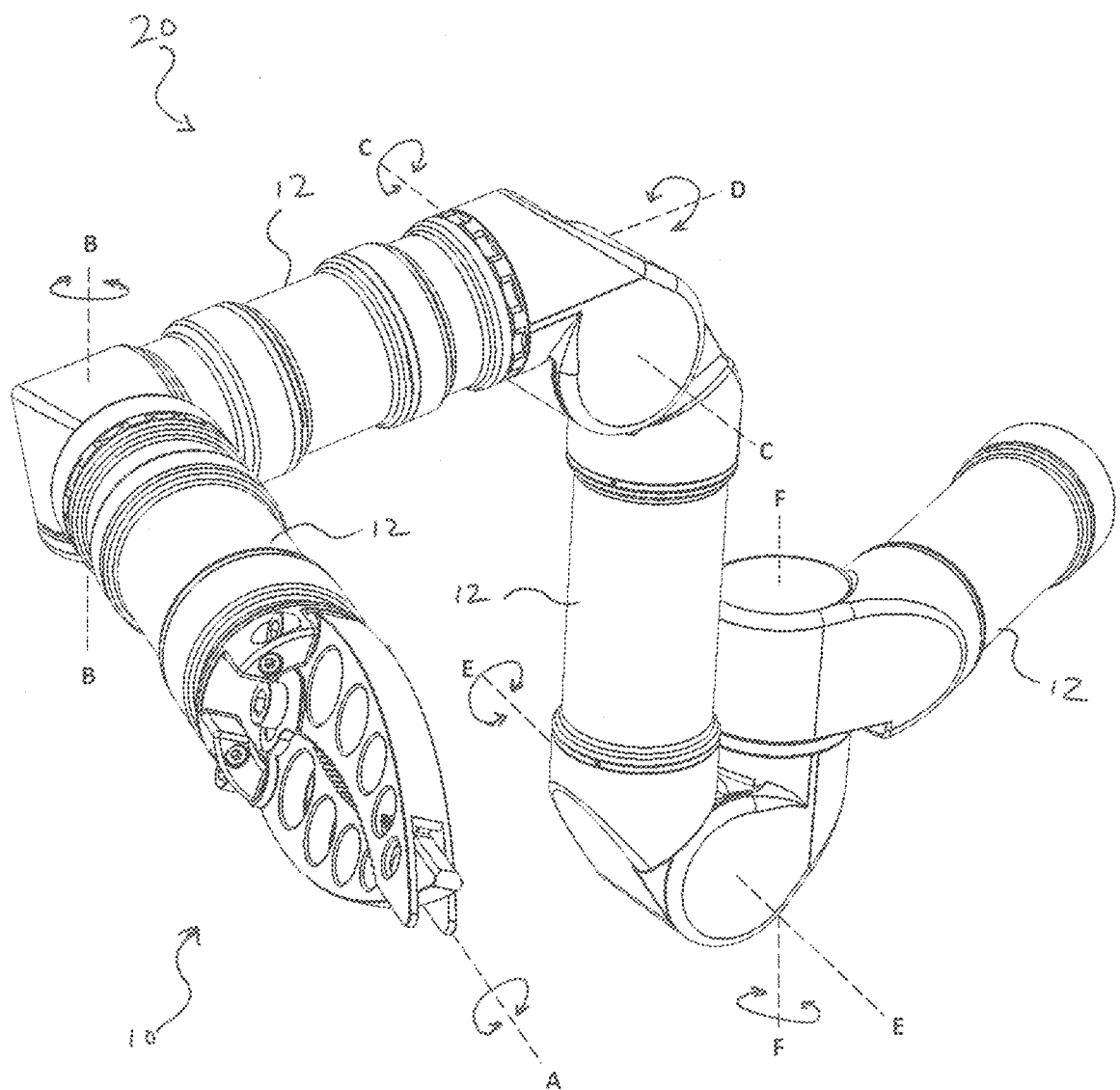
FIG. 1 is a perspective view of a first embodiment of a modular robotic system, being a robotic arm.

In FIG. 1, the modular robotic system 10 is in the form of a robotic arm 20 comprising tour modules 12 and, at one end of the arm 20, an end effector, in the embodiment shown, in the form of an opposable claw 22. The other end of the arm 20 is securable to a structure typically by a bracket or mount (not shown). The modules 12 are configured to define six axes (A to F) which provide six degrees of freedom for the claw 22, and also to actuate (open/close) the claw 22. It will be appreciated that the illustrated embodiment is one of many different configurations of the arm 20 and that the arm 20 may be alternatively configured to include more or fewer modules 12, and therefore define more or fewer axes, depending on its intended application.

Figure 2:
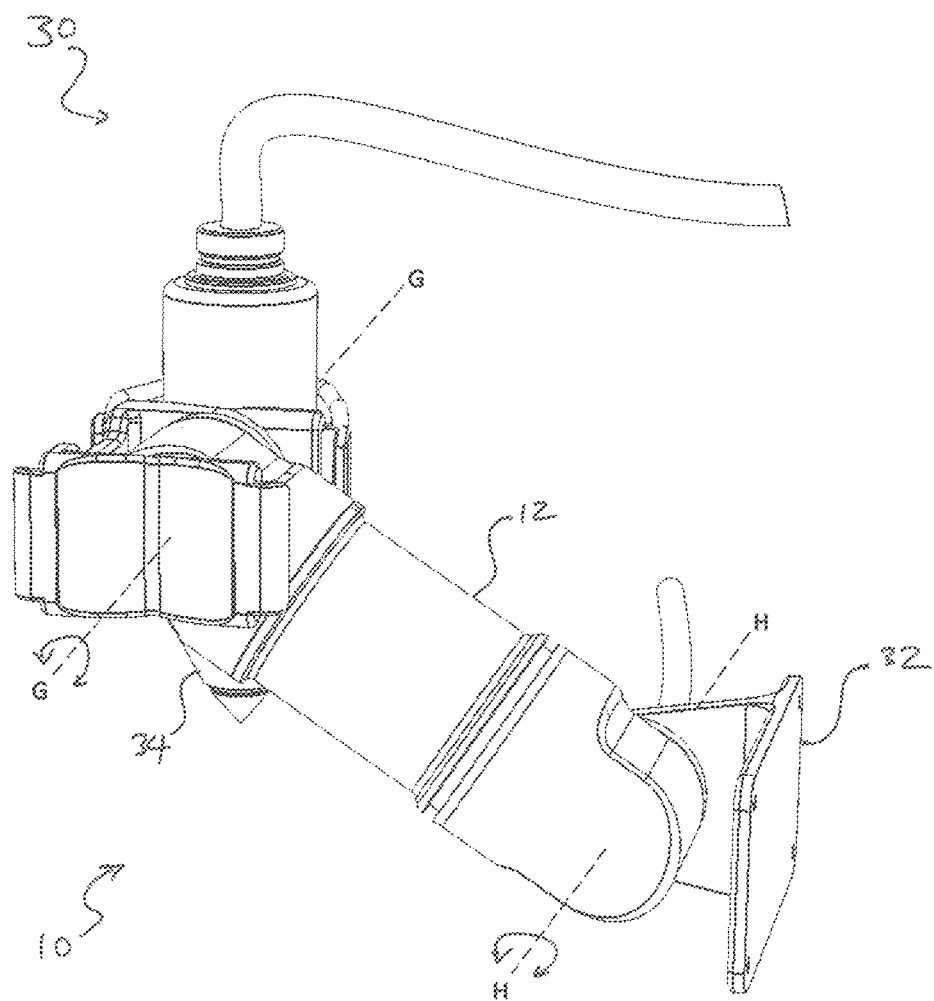
FIG. 2 is a perspective view of a second embodiment of a modular robotic system, being a probe manipulator.

In FIG. 2, the modular robotic system 10 is in the form of a probe manipulator 30 comprising a single module 12 and a mounting bracket 32. An alternative end effector, in the trim of a probe 34, is secured to the manipulator 30. The module 12 defines two parallel axes (G and H) which provide two degrees of freedom for the probe 34. It will be appreciated that the probe 34 can be substituted for, or used in combination with, other end effectors, such as a carabiner, camera, and/or mine disruptor.

Each module 12 is hermetically sealed and sealingly engaged with one or more of the other modules 12 so that the arm 20 and the manipulator 30 are optimised for underwater applications. The arm 20 and the manipulator 30 are typically configured for use as an accessory for a small, lightweight ('man-portable') unmanned underwater vehicle (UUV), such as the "Fusion" platform produced by Strategic Robotic Systems (SRS) or the "CEP75" platform produced by ECA Group. However it will be appreciated that the arm 20 and the manipulator 30 can alternatively be affixed to static sub-sea structures or used for land-based or space applications.

FIGS. 3 to 5 illustrate three different module embodiments 121, 122, 123 for constructing the modular robotic system 10. Each module 121, 122, 123 includes a pair of actuator mechanisms, configured as actuation modules 90, connected by a sleeve 40 to define the sealed volume. Each actuation module 90 includes a carrier 92 (FIG. 6) for carrying the motor 14 and the associated actuator 16. The carrier 92 and the sleeve 40 each define a longitudinal axis, the longitudinal axes being arranged coaxially (Q). The features of the actuation modules 90 are described in detail below (FIGS. 11 to 16). Operating any actuator 16 causes force to be exerted on an object connected to the actuator 16, such as another module 12 or an end effector.

Where the modules 121, 122, 123 share common features these are indicated by common reference numerals. Each module 121, 122, 123 is shown including two actuation modules 90. It will be appreciated that these are examples of various combinations of actuation modules 90 connected together in one module 12 and that other variations are possible.

Whilst the modules 121, 122, 123 are shown comprising the actuation modules 90 connected to the sleeve 40 to define the sealed volume, it will be appreciated that the modules 121, 122, 123 may be configured to have an alternative housing arrangement to define the sealed volume. For example, at least one carrier 92 and the sleeve 40 may be integrally formed. Also, whilst each module 121, 122, 123 is shown including a pair of actuation modules 90 it will be appreciated that one of these actuation modules 90 may be substituted with an end cap (not shown) where actuation is not required, and that, in such an embodiment, the end cap, sleeve 40 and the actuation module 90 define the sealed volume.

The sleeve 40 of each module 121, 122, 123 defines a common maximum width dimension (orthogonal to the longitudinal axis (Q)) regardless of the combination of actuation modules 90 which form the module 12, In the embodiments shown, this is an outside diameter of the sleeve 40. The sleeve 40 length (parallel to the longitudinal axis (Q)) varies depending on components housed within the module 12, typically being dictated by a length of the motor 14. For example, a 4.5 W motor is typically around 27 mm in length whereas a 10 W motor is typically around 41 mm in length. As each module 12 defines the same maximum width dimension this means that the overall size of the system 10 is compact, which can enhance accessing a wide range of locations.

The module embodiment 121 shown in FIG. 3 has two different rotatable actuators 161, 162 which define two axes (I and J). A first actuator 161 allows rotation of the module 121, or an object secured to the actuator 161, about a first axis (I) which is coaxial with the longitudinal axes (Q). A second actuator 162 allows rotation of the module 121, or an object secured to the actuator 162, about a second axis (J) arranged perpendicular to the longitudinal axes (Q).

The module embodiment 122 shown in FIG. 4 is a variation of the module 121 and has the first rotatable actuator 161 and a linear actuator 163 which define two axes (I and K). The linear actuator 163 allows an object secured to the actuator 163 to be moved along a third axis (K) arranged parallel to, and spaced apart from, the longitudinal axis (Q).

The module embodiment 123 shown in FIG. 5 has two rotatable actuators 164 which define two axes (L and M). The rotatable actuators 164 allow rotation of the module 123, or an object secured to the actuator 164, about the axes (L, M) arranged perpendicular to the longitudinal axis (Q).

Figure 6:
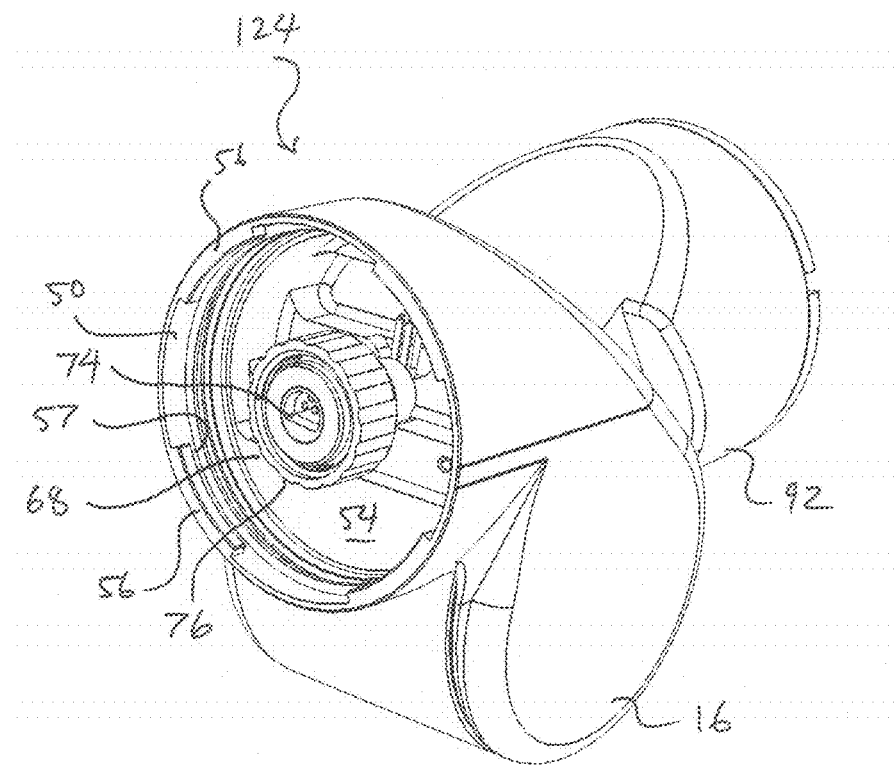
FIGS. 6 and 7 are perspective views of a male component and a female component, respectively, of a releasable connector assembly for connecting two of the modules shown in FIGS. 3 to 5.
Figure 7:
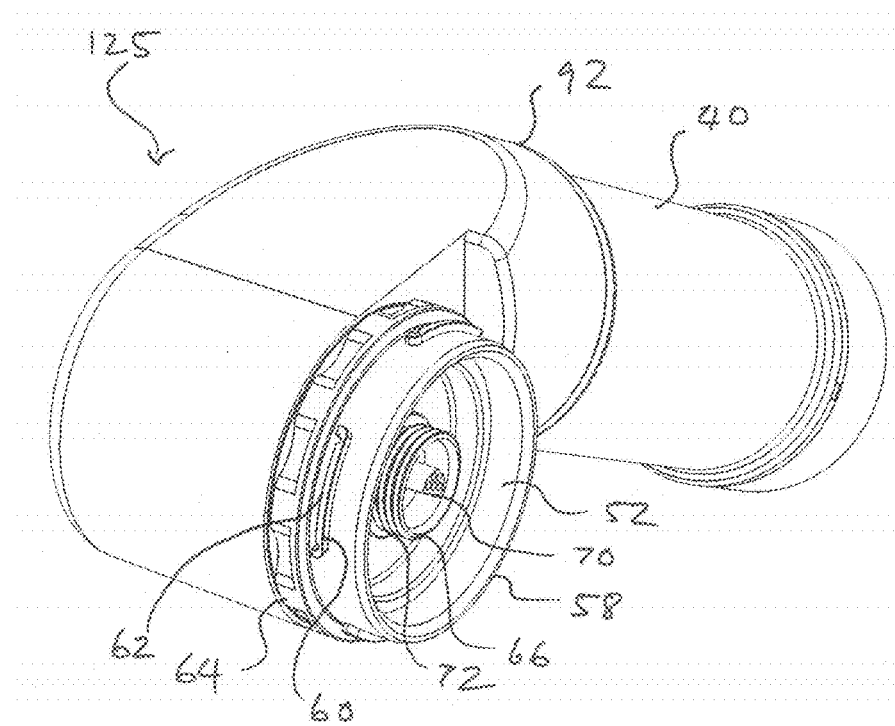

FIGS. 6 and 7 illustrate a mechanical connector arrangement for releasably securing one module 12 to another module 12. FIG. 6 illustrates a female connector 50 defined by the actuator 16 of a first module 124. FIG. 7 illustrates a male connector 52 defined by the carrier 92 of a second module 125.

The female connector 50 defines an aperture 54 dimensioned to at least partially receive the male connector 52. A plurality of protrusions 56 arranged in an annular array extend into the aperture 54. In the embodiment shown, the aperture 54 is substantially cylindrical to define an axis and the protrusions 56 extend radially towards the axis. Each of the protrusions 56 define a mating surface 57 facing away from an open end of the aperture 54.

The male connector 52 has a flange 58 and a plurality of protrusions 60 arranged in an annular array and extending from the flange 58. In the embodiment shown, the flange 58 is substantially cylindrical to define an axis and the protrusions 60 extend radially away from the axis. Each of the protrusions 60 define a mating surface 62 facing away from a free end of the flange 58. Each of the protrusions 60 are shaped to at least partially receive one of the protrusions 56 of the female connector 50. A locking nut 64 is arranged about, and threadedly engaged with, the male connector 52.

To connect the modules 124, 125, the male connector 52 is inserted into the female connector 54 so that the male protrusions 60 move axially past the female protrusions 56. At least one of the connectors 50, 52 is then rotated until the male protrusions 60 are aligned with the female protrusions 56 to cause the mating surfaces 57, 62 to abut and frictionally engage the modules 124, 125, in a bayonet-connector fashion. The locking nut 64 is then rotated to urge against the female connector 50 causing the mating surfaces 57, 62 to urge against each other. This mechanically interlocks, and sealingly engages, the male connector 52 and the female connector 50.

Each module 12 includes electronic components, such as a microprocessor and a PCB (not illustrated), such that the electronics of one module 12 are independently operable of other modules 12 which form the system 10, and can communicate with other modules 12. To enable communication and power transfer between modules 12, each module 12 further includes an electrical connector arrangement. As shown in FIGS. 6 and 7, each of the male connector 52 and the female connector 50 houses an electrical connector 66, 68, respectively, configured to communicate at least one of power and data between engaged modules 12. One electrical connector 66 includes a plug 70 surrounded by a threaded shaft 72. The other electrical connector 68 includes a port 74 surrounded by a threaded nut 76. At least one of the electrical connectors 66, 68 is movable relative to the associated carrier 92. In use, before the male connector 52 and the female connector 50 are engaged, the plug 70 is inserted into the port 74 and the nut 76 threadedly engaged with the shaft 72 to urge against a seal (not shown) and sealingly engage the electrical connectors 66, 68. Whilst the plug 70 is shown associated with the male connector 52 and the port 74 associated with the female connector 50, it will be appreciated that the opposite arrangement is equally applicable.

Figure 8:
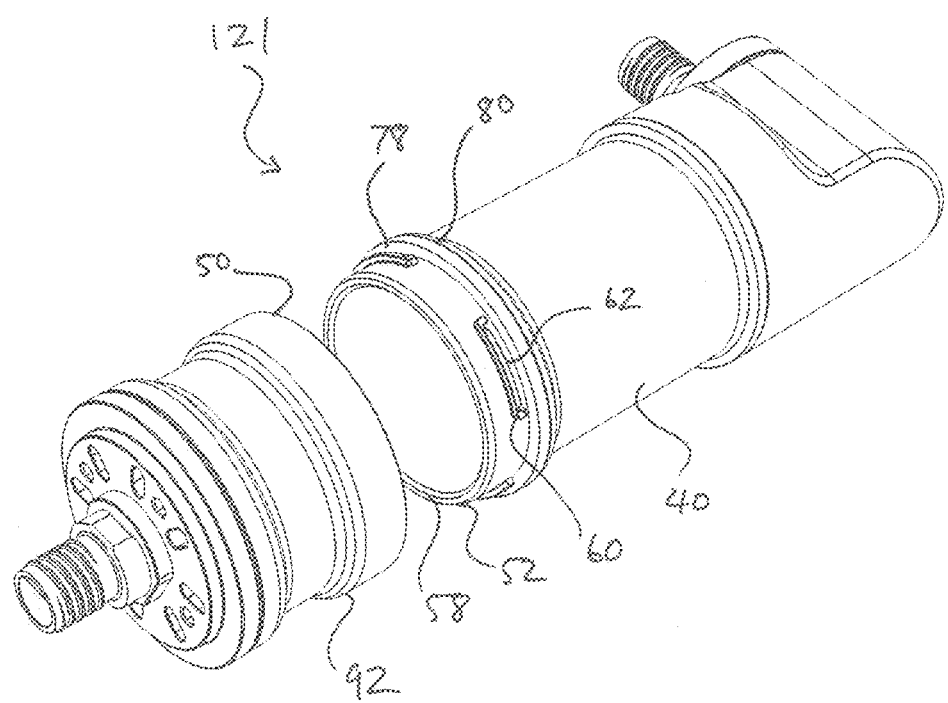
FIG. 8 is perspective, exploded view of the module shown in FIG. 3 illustrating a connector arrangement tier connecting an actuator module and a housing sleeve.

FIG. 8 illustrates an alternative mechanical connector arrangement for securing the carrier 92 to the sleeve 40 however it will be appreciated that this arrangement can alternatively secure two modules 12 together. The connector arrangement shown in FIG. 8 shares features with the connector arrangement shown in FIGS. 6 and 7, whereby common reference numerals indicate common features.

The carrier 92 defines the female connector 50 and the sleeve 40 defines the finale connector 52. A compression member, in the embodiment shown in the form of an annular compression ring 78, is arranged about the male connector 52 and spaced between the protrusions 60 and an abutment surface 80 defined by the sleeve 40. In the embodiment shown, the compression ring 78 is formed from a deformable plastic, typically being plastically deformable, and configured to extend substantially around the male connector 52. It will be appreciated that the compression member may be formed from other materials, to provide different compression properties, and define other forms.

To connect the carrier 92 to the sleeve 40, the male connector 52 is inserted into the female connector 50 and rotated, as described above, so that the mating surfaces 57, 62 abut each other. The compression ring 78 is then inserted between the carrier 92 and the abutment surface 80 defined by the sleeve 40. The compression ring 78 is dimensioned such that in order to insert the ring 78 between the carrier 92 and the sleeve 40, the compression ring 78 must be compressed between the carrier 92 and the abutment surface 80, causing the ring 78 to deform. The deformation of the ring 78 urges the mating surfaces 57, 62 into a robust frictional engagement and sealingly engages the carrier 92 and the sleeve 40.

Figure 9:
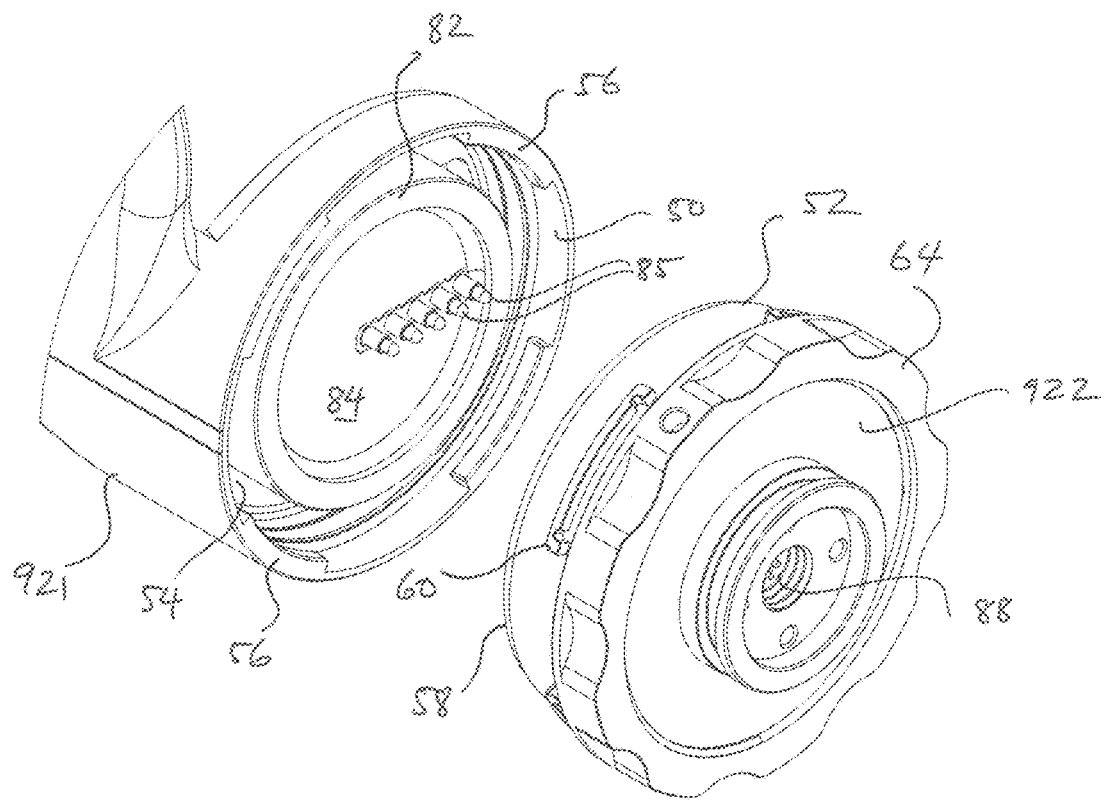
FIG. 9 is a perspective, exploded detailed view of an alternative releasable connector assembly for connecting two modules.
Figure 10:
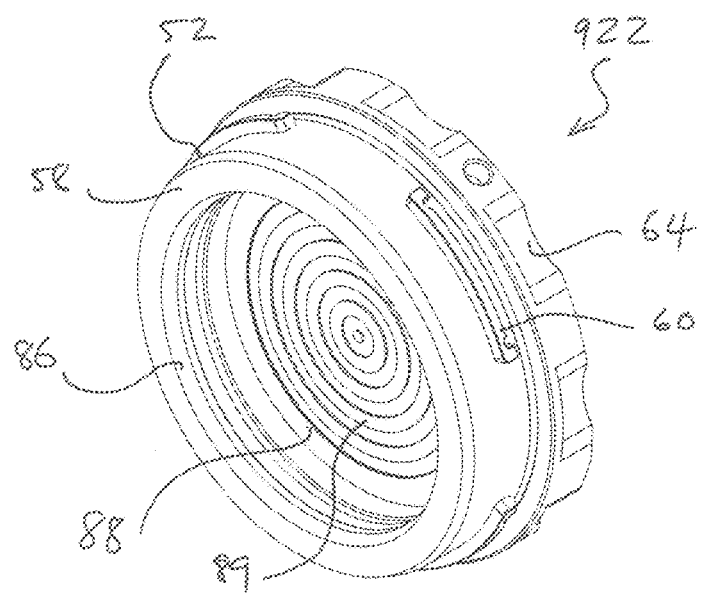
FIG. 10 is a perspective view of part of the releasable connector shown in the previous FIG. 9.

FIGS. 9 and 10 illustrate a further alternative mechanical and electrical connector arrangement for releasably securing modules 12 together and forming an electrical connection between the modules 12. The connector arrangement shown in FIGS. 9 and 10 share features with the connector arrangement shown in FIGS. 6 and 7, whereby common reference numerals indicate common features.

A first carrier 921 defines the female connector 50. An annular rib 82 is arranged within the aperture 54 and is dimensioned to retain an alternative electrical connector 84 including a plurality of contacts 85. A second carrier 922 defines the male connector 52 and a second aperture 86 dimensioned to at least partially receive the rib 82 and the connector 84. The second aperture 86 houses a further alternative electrical connector 88 including a slip ring 89. When the bayonet fitting features of the first carrier 921 and the second carrier 922 are engaged, the contacts 85 abut the slip ring 89 and maintain electrical contact whilst the carriers 921, 922 rotate relative to each other. This means that engaging the male connector 52 and the female connector 50, and operating the locking nut 64, mechanically and electrically connects the carriers 921, 922 together in a single operation.

FIGS. 11 to 16 show different actuator mechanisms embodied as actuation modules 90. Each actuator mechanism includes the motor 14, typically being an electric motor, a carrier 92 configured to be secured to the motor 14, and the actuating member 16. The motor 14 has a drive shaft 15 which defines an output axis (R) and a body 17 extending away from the shaft 15. The body 17 defines a maximum width dimension orthogonal to the output axis (R). The actuator 16 is operatively connected to the shaft 15 such that operation of the motor 14 causes the actuating member 16 to move relative to the carrier 92. The carrier 92 defines a longitudinal axis (Q) parallel to the output axis (R). The output axis (R) is arranged offset from the longitudinal axis (Q) by at least half of the maximum width dimension.

Each actuation module 90 typically also includes a gearing mechanism 94 to transmit drive from the drive shaft 15 to the actuator 16, and an encoder 19, typically being an absolute encoder, configured to derive a position of the actuator 16 and/or the gearing mechanism 94. Positional data, and control instructions, are communicated between an operator and the actuator mechanism 90 via a PCBA having a microcontroller (not shown).

Figure 11:
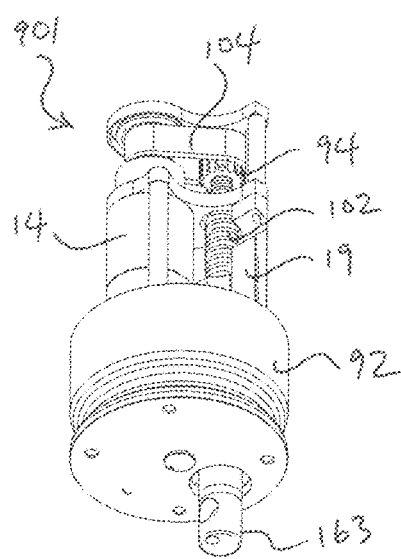
FIGS. 11 to 16 show perspective, side and cross-section views of three different actuator mechanisms for constructing the modules shown in FIGS. 3 and 4.
Figure 12:
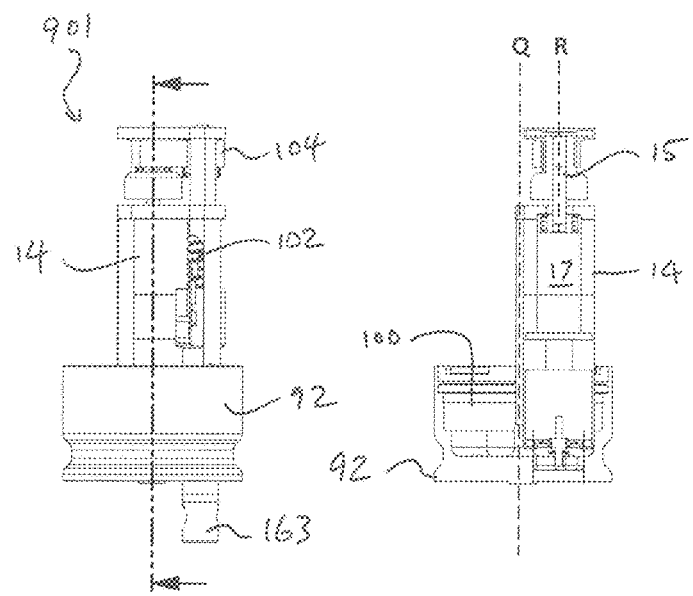

FIGS. 11 and 12 show a linear actuation module 901 configured to operate the linear actuator 163 (FIG. 4). Best shown in FIG. 12, the motor 14 is fixedly secured to the carrier 92 in a receiving formation which, in the embodiment shown, is defined by a recess 100 extending into the carrier 92. The carrier 92 is substantially cylindrical to define the longitudinal axis (Q) centrally and parallel to the output axis (R). The carrier 92 arranges the motor 14 offset from the longitudinal axis (Q) to space the output axis (R) from the longitudinal axis (Q) by at least half the maximum width of the motor body 17. The drive shaft 15 is arranged extending away from the carrier 92 and is drivingly engaged with the linear actuator 163 via the gearing mechanism 94. In this embodiment, the gearing mechanism 94 includes a lead screw 102 threadedly engaged with a second carrier (not shown) connected to the actuator 163. Operating the drive shaft 15 drives a belt 104 which, in turn, drives the lead screw 102. Rotating the drive shaft 15 in a first direction causes a free end of the actuator 163 to translate away from the carrier 92, and rotating the drive shaft 15 in the opposite direction causes the free end of the actuator 163 to translate towards the carrier 92. The encoder 19 is attached to the carrier 92 and arranged to record movement of the lead screw 102.

Figure 13:
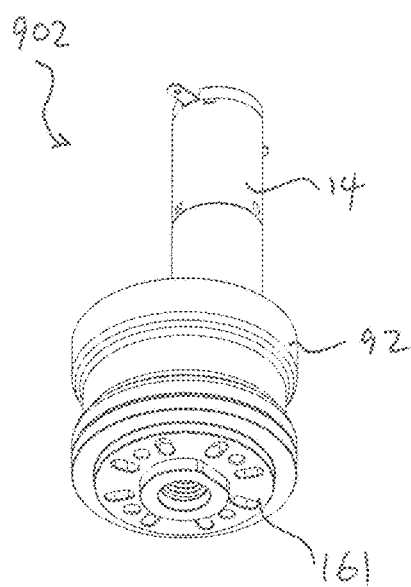
Figure 14:
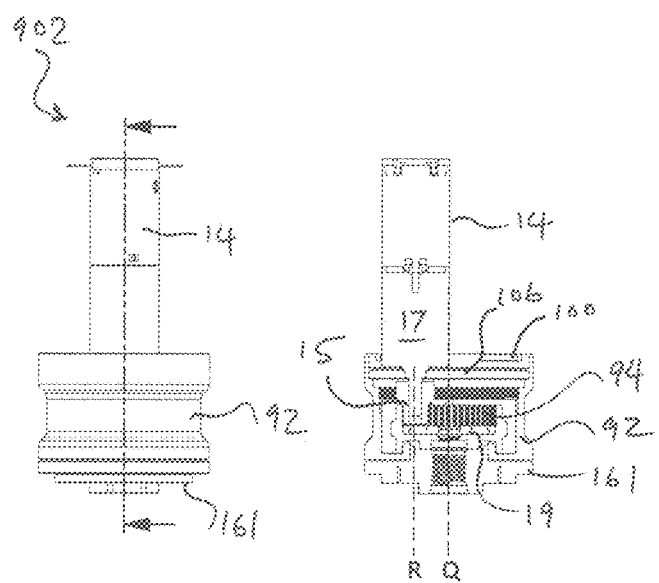

FIGS. 13 and 14 show an in-line rotary actuation module 902 configured to operate the in-line rotary actuator 161 (FIGS. 3 and 4). Best shown in FIG. 11B, the motor 14 is fixedly secured to the carrier 92 in the receiving formation which, in the embodiment shown, is defined by the recess 100. The carrier 92 is substantially cylindrical to define the longitudinal axis (Q) centrally and parallel to the output axis (R), and arranges the motor 14 offset from the longitudinal axis (Q) to space the output axis (R) from the longitudinal axis (Q) by at least half the maximum width of the motor body 17. An insert 106 is arranged in the recess 100 and configured to be secured to the body 17 and receive the drive shaft 15. The drive shaft 15 is arranged extending towards the actuator 161 and is drivingly engaged with the actuator 161 via the gearing mechanism 94. The encoder 19 is arranged within the carrier 92 and arranged to record movement of the gearing mechanism 94.

Figure 15:
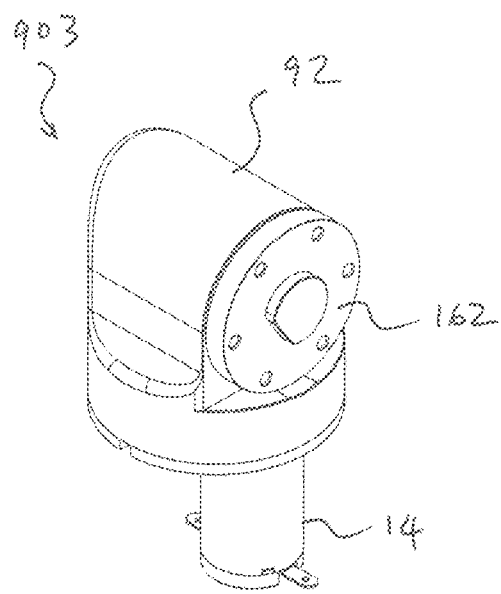
Figure 16:
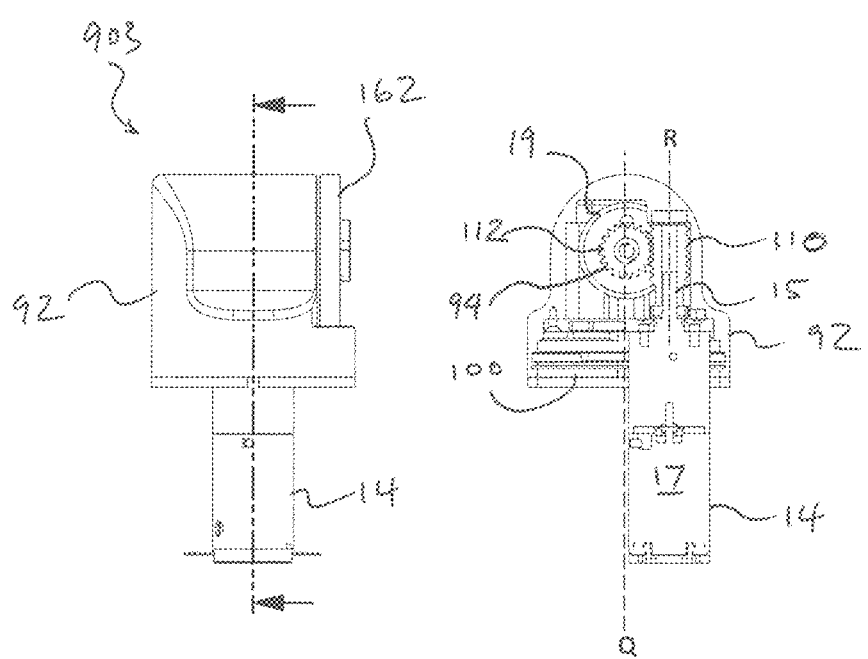

FIGS. 15 and 16 show a transverse rotary actuation module 903 configured to operate the transverse rotary actuator 162 (FIG. 3). Best shown in FIG. 12B, the motor 14 is fixedly secured to the carrier 92 in the receiving formation which, in the embodiment shown, is defined by the recess 100. The carrier 92 is partially cylindrical to define the longitudinal axis (Q) centrally and parallel to the output axis (R), and arranges the motor 14 offset from the longitudinal axis (Q) to space the output axis (R) from the longitudinal axis (Q) by at least half the maximum width of the motor body 17. A plate 108 is arranged in the recess 100 and configured to be secured to the body 17 and receive the drive shaft 15. The drive shaft 15 is arranged extending towards the actuator 162 and is drivingly engaged with the actuator 162 via the gearing mechanism 94. The gearing mechanism 94 includes a worm gear 110 arranged to be driven by the drive shaft 15 and drivingly engaged with a cog 112 which, in turn, drives the actuator 162. The encoder 19 is arranged within the carrier 92 to record movement of the gearing mechanism 94.

Figure 17:
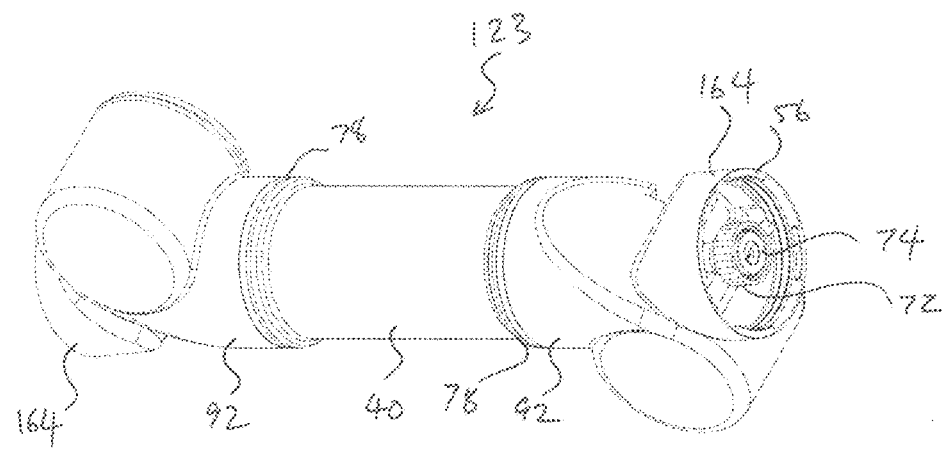
FIGS. 17 and 18 are perspective and cross-section views, respectively, of the module shown in FIG. 5.
Figure 18:
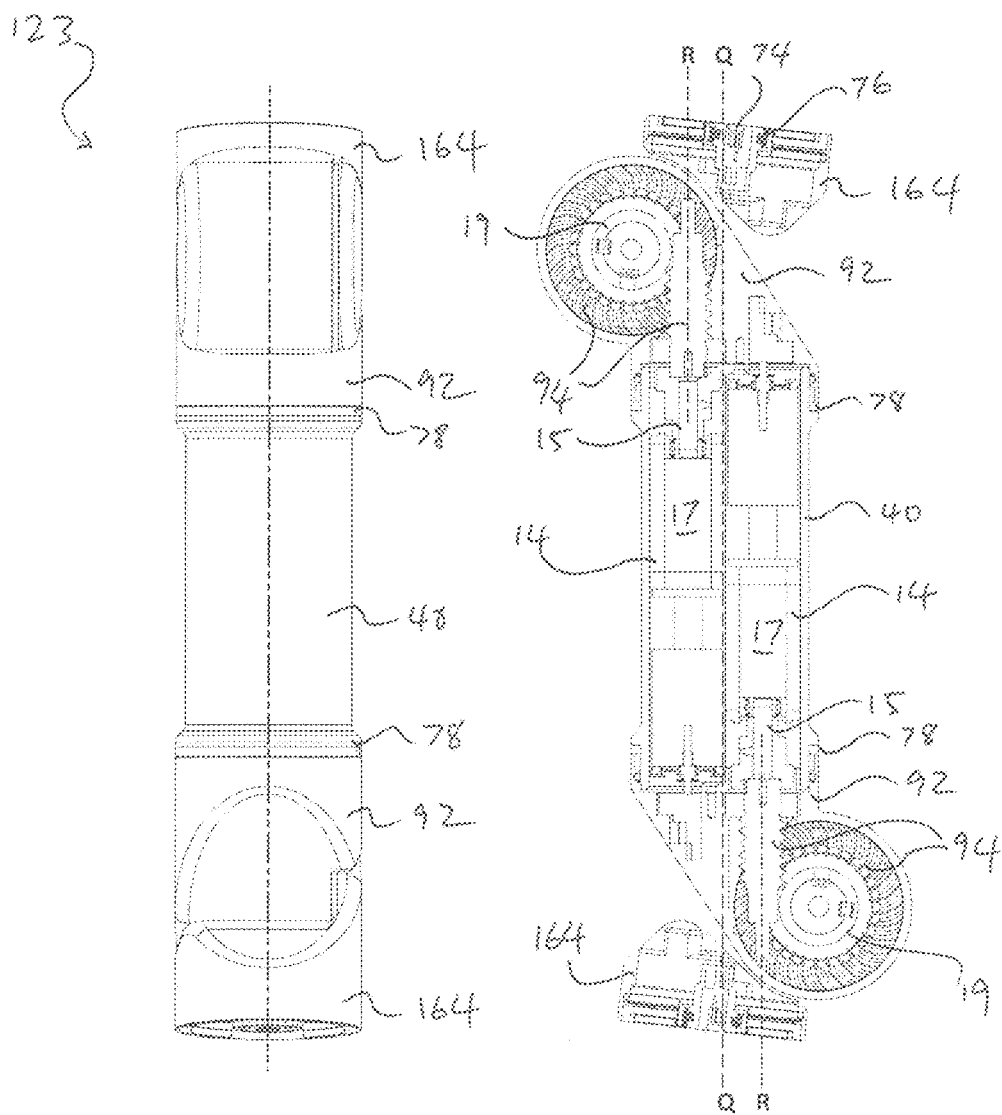

FIGS. 17 and 18 show the module 123 (FIG. 5) which includes a pair of high-torque transverse rotary actuation modules 904 connected by the sleeve 40. Each high-torque transverse rotary actuation module 904 is configured to operate the high-torque rotary actuator 164 (FIG. 5). Best shown in FIG. 18, the motor 14 of each actuator module 904 is fixedly secured to the associated carrier 92 in the receiving information which, in the embodiment shown, is defined by the recess 100. Each carrier 92 is partially cylindrical to define the longitudinal axis (Q) centrally and parallel to the output axis (R), and arrange the motor 14 offset from the longitudinal axis (Q) to space the output axis (R) from the longitudinal axis (Q) by at least half the maximum width of the motor body 17. Each drive shaft 15 is arranged extending towards the associated actuator 164 and is drivingly engaged with the actuator 164 via the gearing mechanism 94. The encoder 19 (not visible in FIG. 12B) is arranged within the carrier 92 and at least partially surrounding part of the gearing mechanism 94. The motors 14 of the actuation modules 904 are arranged by the carriers 92 in an opposed orientation and adjacent each other. Each carrier 92 is shaped to at least partially receive the motor 14 of the opposed actuator module 904 so that the opposed actuator modules 904 define a compact package.

Figure 19:
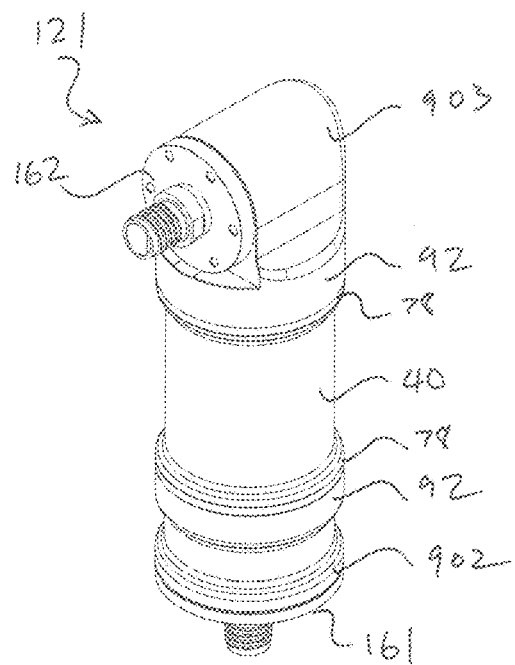
FIGS. 19 and 20 are perspective and cross-section views, respectively, of the module shown in FIG. 3.
Figure 20:
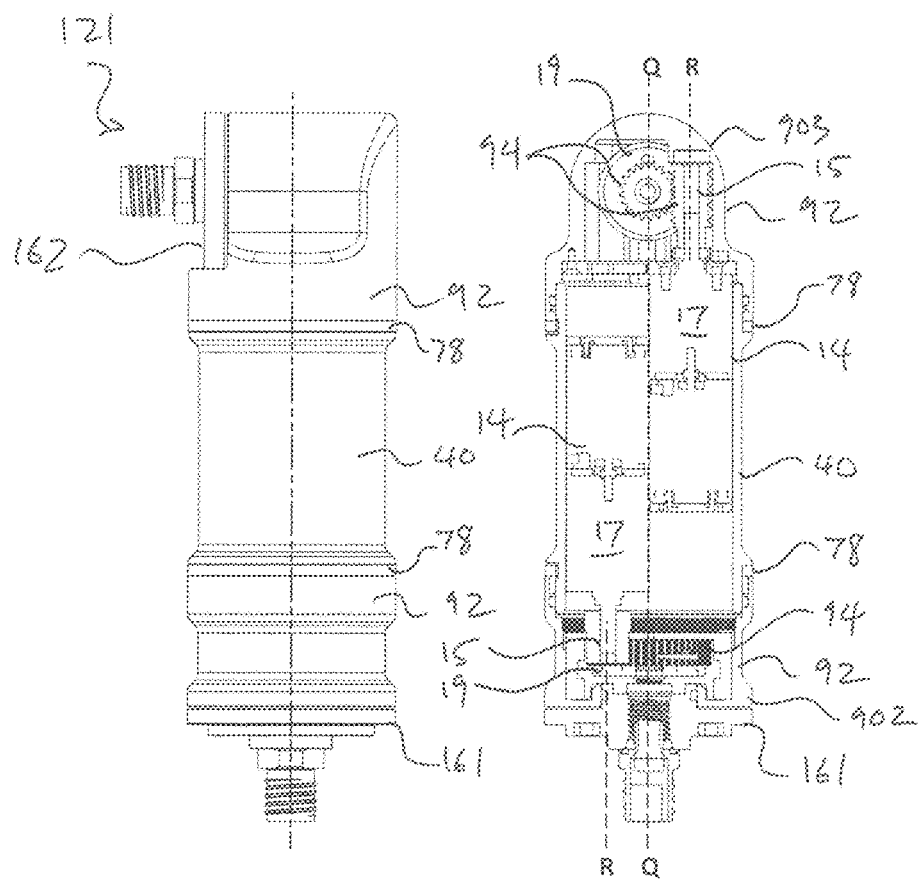

FIGS. 19 and 20 show the module 121 (FIG. 3) which includes the rotary actuation module 902 and the transverse rotary actuation module 903 connected by the sleeve 40. As with the module 123 shown in FIGS. 17 and 18, the motors 14 of the actuation modules 902, 903 are arranged in an opposed orientation and adjacent each other.

Figure 21:
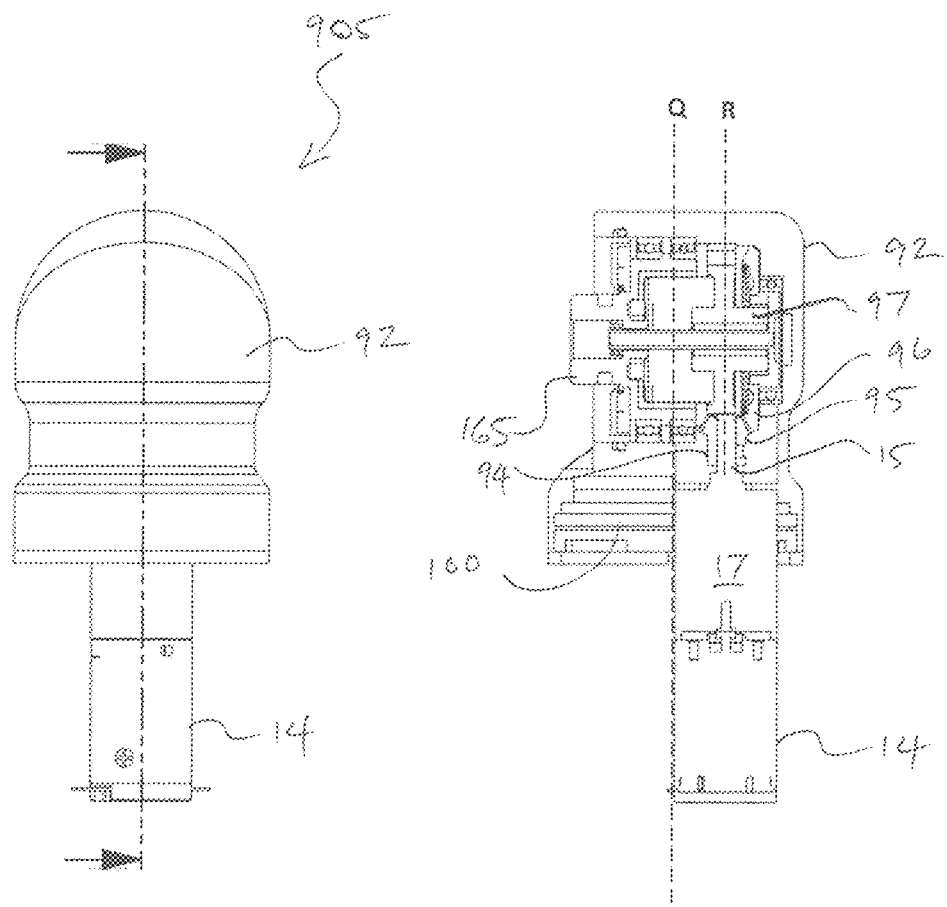
FIG. 21 is a side and cross-section view of an alternative actuator mechanism for constructing the modules shown in FIGS. 3 and 4

FIG. 21 shows an alternative transverse rotary actuation module 905 configured to operate an alternative transverse rotary actuator, in the form of a partially hollow output shaft 165. Best shown in the cross-section view, the motor 14 is fixedly secured to the carrier 92 in the receiving formation which, in the embodiment shown, is defined by the recess 100. The carrier 92 is partially cylindrical to define the longitudinal axis (Q) centrally and parallel to the output axis (R), and arranges the motor 14 offset from the longitudinal axis (Q) to space the output axis (R) from the longitudinal axis (Q) by at least half the maximum width of the motor body 17. The drive shaft 15 is arranged extending towards the actuator 165 and is drivingly engaged with the actuator 162 via the gearing mechanism 94. The gearing mechanism 94 includes a bevel pinion 95 arranged to be driven by the drive shaft 15 and drivingly engaged with a bevel spur 96. The spur 96 is arranged to drive a strain wave gear 97 (also referred to as a Harmonic Drive or a harmonic gear) which, in turn, drives the output shaft 165. The arrangement of the bevel gears 95, 96 in this way allows the strain wave gear 97 to be arranged perpendicular to the drive shaft 15, thereby allowing drive to be conveyed at a right angle to the drive shaft 15.

Use of the modular robotic system 10 involves a user defining the system 10 specification, such as defining required degrees of freedom and/or axes of motion, and any end effector; assembling one or more of the modules 12 according to the specification where each module 12 includes one or more of the actuation modules 90; where the system 10 comprises more than one module, connecting the modules 12 together; mounting the system 10 to a structure, which may be a vehicle; providing power and a data connection to the system 10; and providing instructions to the modules 12 to effect movements of the one or more actuators 16 defined by the user.

Where the system 10 comprises a plurality of the modules 12, maintenance of the system 10 may involve disconnecting a faulty module 12 from each connected module 12 by operating one or two of the locking rings 64 (depending on the configuration of the system 10) and disengaging the associated male and female connectors 52, 50, and replacing the faulty module 12. Similarly, the system 10 can be reconfigured for a different application in the same way, for example, to provide a different range of motion by substituting one module 12 for another.

It will be appreciated that the configuration of the system 10 and the component modules 12 and actuation modules 90 allows a wide range of different systems 10 to be constructed from a kit of a few common parts, being the modules 12 and actuation mechanisms 90. This provides a highly variable robotic system 10 able to perform a wide range of functions and which is simple to assemble, and is typically affordable.

Configuring the system 10 to be constructed from a plurality of the modules 12, and each module 12 to be constructed from at least one actuation module 90, means that each actuation module 90 and module 12 can be independently manufactured, assembled, calibrated and tested. This staged manufacturing and testing process advantageously enhances reliability of the system 10 and decreases manufacturing complexity and costs. As each module 12 defines a sealed volume, this approach is particularly useful as this allows any penetration of the sealed volume to be readily identified and addressed.

Each actuator module 90 is configured to arrange the motor 14 to be spaced from the longitudinal axis (Q) of the carrier 92, and/or the module 12, by at least half of the maximum width of the motor body 17. This allows two actuator modules 90 to be arranged in one module 12 in an opposed orientation, with the respective motors 14 arranged side-by-side. This advantageously minimises the bulk of the module 12 which has the effect of minimising the overall size of the robotic system 10. This is useful as this allows the system 10 to access space-restricted locations and/or enhances the dexterity of the system 10. Furthermore, this allows the system 10 to be stowed in a compact configuration, which can enhance mobility of a host vehicle and/or avoid damage to the system 10 during transit by the host vehicle.

The configuration of the actuator modules 90 to allow two opposed motors 14 to be secured in the same module 12 also means that, regardless of the combination of different actuator modules 90, the module 12 defines the same width dimension, orthogonal to the longitudinal axis (Q). This simplifies complexity of the modules 12 as, for example, the connecting sleeve 40 only ever needs to be varied in length (and not width/diameter), which enhances manufacture and assembly of the modules, and consequently reduces costs.

Each module 12 defines a sealed volume and is releasably connected to one or more other modules 12 to construct the system 10. Should one of the modules 12 be damaged, it can be readily removed from the system 10 and replaced. The configuration of the modules 12 in this way is helpful when operating the system 10 underwater as, in the event of a leak in one of the modules 12, the independently sealed module arrangement prevents fluid being communicated through more than one of the modules 12. Similarly, when the system 10 is operated in space, the sealed module 12 construction maintains positive air pressure in each module 12 which reduces risk of housed electronics arcing due to operating in a vacuum and, in the event of the seal of one module being breached, prevents loss of air pressure from the entire system 10. This arrangement therefore can reduce or eliminate failure of the entire system 10 and/or reduce maintenance down time and costs.

The invention claimed is:

1. An A module for a modular robotic system, the module comprising:
    a pair of actuator mechanisms, each mechanism comprising:
        a motor having a drive shaft, the shaft defining an output axis, and a body extending away from the shaft, the body defining a maximum width dimension orthogonal to the output axis;
        a carrier configured to be secured to the motor, the carrier defining a longitudinal axis parallel to the output axis; and
        an actuating member operatively connected to the shaft such that operation of the motor causes the actuating member to move relative to the carrier,
        wherein the output axis is arranged offset from the longitudinal axis by at least half of the maximum width dimension; and
    a sleeve sealingly engaged with the carrier of each actuator mechanism such that the sleeve and the carriers define a sealed volume, the sleeve defining a further longitudinal axis arranged coaxially to the longitudinal axis of each carrier.

2. The module according to claim 1, wherein operation of either motor causes the associated actuating member to perform one of the following operations: move along the longitudinal axis; rotate about the longitudinal axis; and rotate about an actuator axis arranged transverse to the longitudinal axis.

3. The module according to claim 1, wherein at least one of the actuating mechanisms further comprises: a gearing mechanism arranged between the shaft and the associated actuating member, the gearing mechanism configured to transmit drive to the actuating member.

4. The module according to claim 1, further comprising an end cap, and wherein the sleeve is sealingly engaged with the end cap such that the end cap, the sleeve and the carrier define the sealed volume.

5. The module according to claim 1, wherein the motors are arranged adjacent to each other and in an opposed orientation.

6. The module according to claim 1, wherein each carrier defines a receiving formation shaped to at least partially receive the associated motor, and wherein the receiving formation defines the longitudinal axis.

7. The module according to claim 6, wherein each receiving formation is shaped to at least partially receive a further motor arranged in an opposed orientation to the motor.

8. The module according to claim 1, wherein each of the sleeve and each carrier defines a complementary bayonet fitting configured to engage the sleeve and carriers.

9. The module according to claim 8, wherein one of the sleeve and each carrier defines a male connector, and the other defines a female connector,
    wherein the male connector has a flange defining a free end and a plurality of mating surfaces facing away from the free end, and
    the female connector defines an aperture defining an open end and dimensioned to at least partially receive the flange, and further defines a plurality of complementary mating surfaces facing away from the open end,
    whereby arranging the mating surfaces of the male connector against the mating surfaces of the female connector frictionally engages the sleeve and the carrier.

10. The module according to claim 9, further comprising a compression member arranged about the male connector such that the compression member is compressed between the sleeve and the associated carrier when the sleeve frictionally engages the carrier.

11. The module according to claim 10, wherein each mating surface is defined by a radially extending protrusion, and wherein each protrusion extending from the male connector is shaped to at least partially receive one of the protrusions extending from the female connector.

12. A modular robotic system comprising at least two modules, each module comprising:
    at least one actuator mechanism, each actuator mechanism comprising:
        a motor having a drive shaft, the shaft defining an output axis, and a body extending away from the shaft, the body defining a maximum width dimension orthogonal to the output axis;
        a carrier configured to be secured to the motor, the carrier defining a longitudinal axis parallel to the output axis; and
        an actuating member operatively connected to the shaft such that operation of the motor causes the actuating member to move relative to the carrier,
        wherein the output axis is arranged offset from the longitudinal axis by at least half of the maximum width dimension; and
    a sleeve sealingly engaged with each carrier, to define a sealed volume, the sleeve defining a further longitudinal axis arranged coaxially to the longitudinal axis of each carrier,
    wherein the at least two modules are releasably connected to and sealingly engaged with each other, and wherein at least one of the actuators of the at least two modules is arranged such that operation of the at least one actuator moves one of the modules relative to another of the modules.

13. The modular system according to claim 12, wherein one of the modules defines a male connector and another of the modules defines a female connector configured to at least partially receive and engage with the male connector, wherein one of the male connector and the female connector has a locking nut threadedly engaged with the associated connector and operable to urge the male connector and the female connector into engagement.

14. The modular system according to claim 13, wherein each of the male connector and the female connector define a complementary bayonet fitting configured to engage the associated modules.

15. The modular system according to claim 14, wherein the male connector has a flange defining a free end and a plurality of mating surfaces facing away from the free end, and the female connector defines an aperture defining an open end and dimensioned to at least partially receive the flange, and further defining a plurality of complementary mating surfaces facing away from the open end, whereby arranging the mating surfaces of the male connector against the mating surfaces of the female connector frictionally engages the associated modules.

16. The modular system according to claim 15, wherein each mating surface is defined by a radially extending protrusion, and wherein each protrusion extending from the male connector is shaped to at least partially receive one of the protrusions extending from the female connector.

17. The modular system according to claim 12, wherein each of the male connector and the female connector include an electrical connector.

18. The modular system according to claim 17, wherein frictionally engaging the male connector and the female connector connects the electrical connectors such that, in use, at least one of power and data is communicated between the engaged modules.

19. The modular system according to claim 17, wherein one of the electrical connectors includes a threaded shaft, and the other electrical connector includes a threaded nut whereby, in use, the nut threadedly engages the shaft to engage the electrical connectors so that at least one of power and data is communicated between the engaged modules.

* * * * *